(12) United States Patent
Burdsall et al.

(10) Patent No.: US 8,727,389 B2
(45) Date of Patent: May 20, 2014

(54) GAS APPLIANCE

(75) Inventors: Thomas A. Burdsall, Huntersville, NC (US); Michael R. Johnston, Troutman, NC (US)

(73) Assignee: Worthington Torch, LLC, Columbus, OH (US)

( * ) Notice: Subject to any disclaimer, the term of this patent is extended or adjusted under 35 U.S.C. 154(b) by 1365 days.

(21) Appl. No.: 12/113,447

(22) Filed: May 1, 2008

(65) Prior Publication Data

US 2008/0274434 A1     Nov. 6, 2008

Related U.S. Application Data

(60) Provisional application No. 60/927,716, filed on May 4, 2007.

(51) Int. Cl.
    *F16L 37/248*     (2006.01)

(52) U.S. Cl.
    USPC ......... 285/391; 285/401; 403/299; 220/254.8

(58) Field of Classification Search
    CPC ....... F16L 15/007; F16L 19/005; F16L 37/24; F16L 37/2445; F16L 37/242; F16L 37/248; F16L 15/06
    USPC ........... 285/87, 390, 391, 360–361, 376–377, 285/401–402; 220/254.8; 403/299
    See application file for complete search history.

(56) References Cited

U.S. PATENT DOCUMENTS

| | | | | |
|---|---|---|---|---|
| 1,311,145 A | * | 7/1919 | Zeindler et al. | 285/27 |
| 2,889,156 A | * | 6/1959 | Dearing et al. | 285/55 |
| 3,213,649 A | * | 10/1965 | Kenichi | 431/344 |
| 3,512,912 A | * | 5/1970 | Linch | 431/344 |
| 3,884,379 A | * | 5/1975 | Landen | 215/221 |
| 3,892,326 A | * | 7/1975 | Schneible | 215/221 |
| 3,917,097 A | * | 11/1975 | Uhlig | 215/216 |
| 3,939,788 A | * | 2/1976 | Schneible | 425/6 |
| 3,948,545 A | * | 4/1976 | Bonds | 285/4 |
| 3,994,674 A | * | 11/1976 | Baumann et al. | 431/354 |
| 4,144,983 A | * | 3/1979 | Pauls et al. | 215/216 |

(Continued)

FOREIGN PATENT DOCUMENTS

| | | |
|---|---|---|
| DE | 830877 C | 2/1952 |
| EP | 1714705 A | 10/2006 |

(Continued)

OTHER PUBLICATIONS

European Patent Office, Search Report, Dec. 9, 2008.

(Continued)

*Primary Examiner* — James Hewitt

(74) *Attorney, Agent, or Firm* — Hasse & Nesbitt LLC; W. Charles Ehlers; Daniel F. Nesbitt

(57) ABSTRACT

A coupling for attaching a fuel canister to an appliance such as a torch comprises a first connector on the canister. The first connector comprises a first set of screw threads where the first set of screw threads are interrupted to define a shape. A second connector on the appliance comprises a locking element. The locking element has a matching shape that matches the shape such that the locking element closely receives the first connector when the first connector is in a first orientation relative to the second connector.

15 Claims, 11 Drawing Sheets

(56) References Cited

U.S. PATENT DOCUMENTS

| | | | |
|---|---|---|---|
| 4,241,856 A * | 12/1980 | Otterson | 222/539 |
| 4,351,442 A * | 9/1982 | Summers | 215/216 |
| 4,427,124 A * | 1/1984 | Marshall et al. | 215/216 |
| 4,464,316 A * | 8/1984 | Michaels | 261/121.1 |
| 4,781,507 A | 11/1988 | Duenas | |
| 5,083,672 A * | 1/1992 | Lewandowski | 215/322 |
| 5,135,389 A * | 8/1992 | Dai et al. | 431/328 |
| 5,544,768 A * | 8/1996 | Gargione | 215/209 |
| 5,857,262 A * | 1/1999 | Bonnema et al. | 34/97 |
| 6,076,689 A * | 6/2000 | Vassallo | 215/209 |
| 6,102,639 A * | 8/2000 | DiStasio | 411/299 |
| 6,508,373 B1 * | 1/2003 | Robinson | 215/209 |
| 6,527,543 B2 * | 3/2003 | Tsai | 431/153 |
| 7,213,655 B2 * | 5/2007 | Parrott | 166/380 |
| 7,293,936 B1 * | 11/2007 | Warren | 403/296 |
| 7,431,351 B2 * | 10/2008 | Russell | 285/381.1 |
| 2002/0148504 A1 | 10/2002 | Rokkjaer | |
| 2003/0213857 A1 | 11/2003 | Schmon et al. | |
| 2004/0089679 A1 * | 5/2004 | Tackett | 222/561 |
| 2004/0140373 A1 | 7/2004 | Joseph et al. | |
| 2008/0185842 A1 * | 8/2008 | Blackman et al. | 285/376 |
| 2010/0261129 A1 * | 10/2010 | Lin | 431/344 |

FOREIGN PATENT DOCUMENTS

| | | |
|---|---|---|
| EP | 1714705 A2 | 10/2006 |
| FR | 2064546 A | 7/1971 |
| FR | 2411363 A | 7/1979 |
| WO | 2004037432 A1 | 5/2004 |
| WO | WO2004037432 A | 5/2004 |

OTHER PUBLICATIONS

European Patent Office, International Search Report, Oct. 8, 2008.

* cited by examiner

GAS APPLIANCE

This application claims the benefit of U.S. Provisional Application No. 60/927,716 filed May 4, 2007, the disclosure of which is incorporated herein in its entirety by reference.

The invention relates generally to torches or other gas fueled appliances and more particularly to a coupling for connecting a fuel canister to a torch head or other appliance.

BACKGROUND

The invention relates to gas fueled appliances including torches such as propane, propylene, butane, mixed gas or MAPP fueled torches that use a source of fuel that is ignited by a spark generated by, for example, a piezoelectric igniter (collectively "torches"). Such torches are used for heating, soldering, brazing, welding and the like.

Torches are known where a fuel canister is releasably connected to a torch head by a threaded connection. Typically the canister includes external threads that threadably engage internal threads formed in the torch head. The torch head is threaded onto the canister by rotating the torch head relative to the canister multiple turns until the torch head is tightly secured to the canister. Such a connection requires multiple turns of the torch head relative to the canister which is a time consuming and relatively inconvenient process. Further it may be difficult for a user to determine when the torch head is fully tightened on the canister.

SUMMARY OF THE INVENTION

A coupling for attaching a fuel canister to an appliance is provided that comprises a first connector on the canister. The first connector comprises a first set of screw threads where the first set of screw threads are interrupted to define a shape. A second connector is provided on the appliance where the second connector comprises a locking element. The locking element has a matching shape that matches the shape of the interrupted screw threads such that the locking element closely receives the first connector when the first connector is in a first orientation relative to the second connector. A method of using the coupling is also provided where the appliance is rotated relative to the canister less than 360 degrees.

DETAILED DESCRIPTION OF EMBODIMENTS OF THE INVENTION

Figure 1:
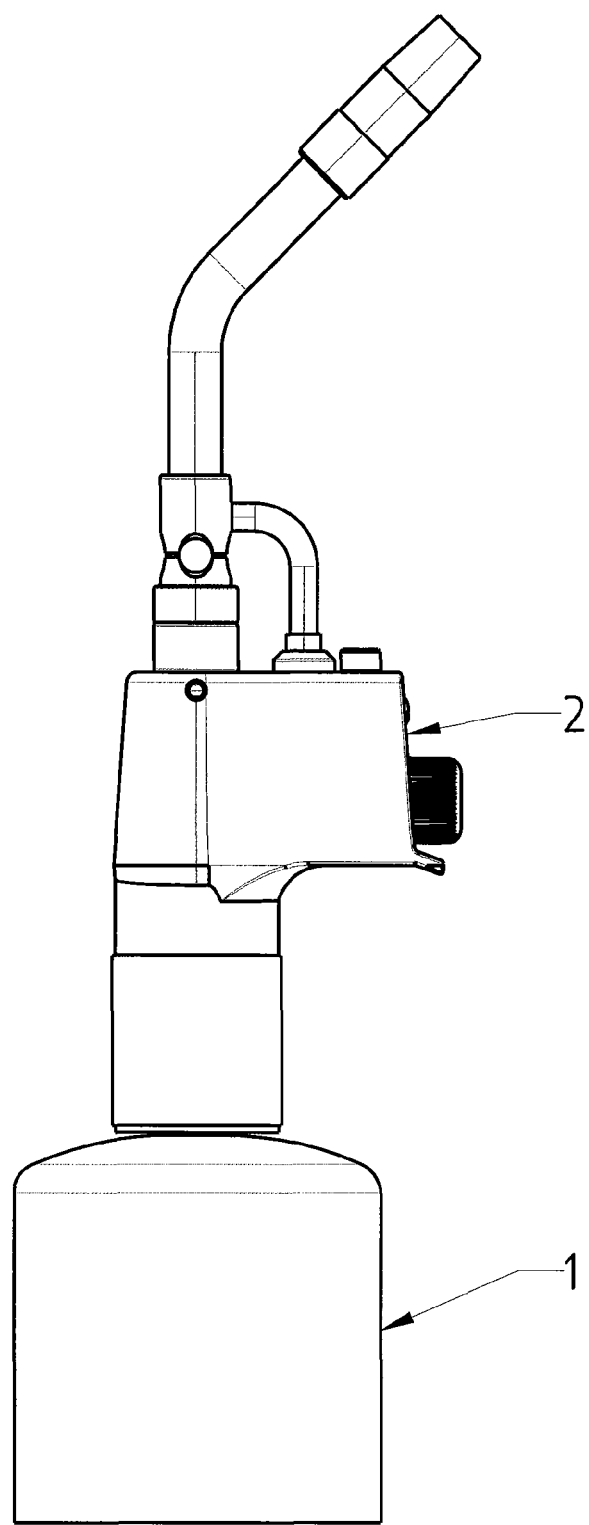
FIG. 1 is a side view of an embodiment of a torch head connected to a canister.
Figure 2:
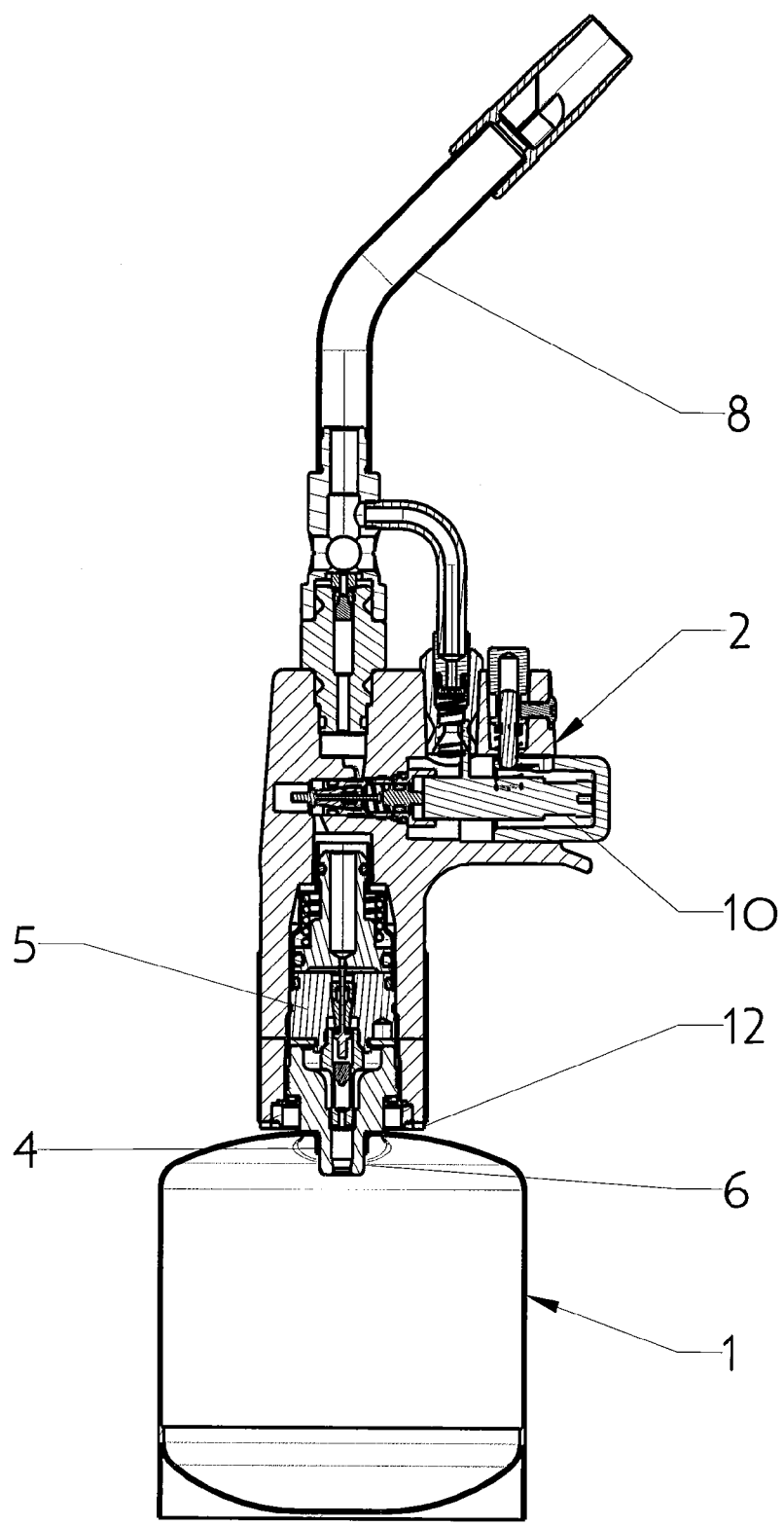
FIG. 2 is a partial section side view showing the torch head and canister of FIG. 1.

A quick connect coupling for attaching a fuel canister or tank 1 to an appliance such as a torch or torch head 2 is shown in the Figures. The canister 1 may contain a fuel such as propane, propylene, butane, MAPP gas, or the like. Canister 1 includes a port 4 for communicating the interior of the canister 1 with the exterior. A first connector 6 is located in the port 4 for connecting the canister 1 to the appliance or torch head 2 as will hereinafter be described. The torch head 2 comprises a valve assembly and fuel line 5 for controlling the flow of fuel from the canister 1 to the burn tube 8. The fuel is ignited in the burn tube 8 by, for example, a piezoelectric igniter 10. A control may be provided for adjusting the flame size. A second connector 12 is secured to the end of the torch head 2 for releasably coupling to the first connector 6 as will hereinafter be described. While the invention is described herein with specific reference to a torch it will be appreciated that the coupling of the invention may be used with any appliance that releasably connects a source of fuel to the appliance. Such appliances may include but are not limited to stoves, lanterns, heaters and mosquito/insect traps where fuel sources are releasably connected to the appliance for fueling the appliance.

Referring more particularly to FIGS. 3, 5, 7 and 8, the connector 6 is secured in port 4 by any suitable mechanism such as welding to create a seal between the connector 6 and the canister 1. The connector 6 includes a bore 14 that extends to the interior of the canister and through which fuel flows during the use of the torch. A valve 16 may be located in bore 14 to prevent the flow of fuel unless the torch head 2 is secured to the connector 6.

The connector 6 includes a generally cylindrical collar 18 having screw threads 20 formed thereon. Screw threads 20 are dimensioned to threadably engage mating screw threads formed on a standard torch head to allow a canister equipped with the connector 6 of the quick connect coupling of the invention to connect to a conventional torch head. Flat faces 22 and 24 are provided on the collar 18 such that the screw threads 20 are interrupted and form a first screw thread portion 20a and a second screw thread portion 20b. In one embodiment two flat faces are provided arranged diametrically opposed to one another on collar 18. A greater or fewer number of flat faces may be provided and the faces may be arranged in varying patterns around collar 18. Further, the faces may have shapes other than flat provided that the faces properly orient the first connector 6 with the second connector 12 and that the two connectors can engage one another as will hereinafter be described.

Flange 26 extends around the periphery of the connector assembly 6 such that the flange 26 faces toward the canister 1 and away from the torch head 2 when the torch head 2 is connected to canister 1. In the illustrated embodiment the flange 26 is formed as part of collar 18, however, flange 26 may be formed as elements separate from collar 18 or as multiple flanges each supporting one of the cam surfaces 28. Cam surfaces 28 are formed on flange 26. Each cam surface 28 includes an incline plane having a recess 30 formed therein near the end thereof. In the illustrated embodiment two cam surfaces 28 are provided each located between the flat faces 22 and 24. In one embodiment the recesses 30 are located approximately 90 degrees from the center of flat faces 22 and 24.

Where a greater number of flat faces are used or where the flat faces are located other than diametrically opposed to one another the location of the cam surfaces on the flange 26 will likewise vary in number and location. The cam surfaces are located such that they are angularly offset from the flat faces about the periphery of the first connector 6 to enable a locking engagement with the second connector 12 as will hereinafter be described.

Figure 3:
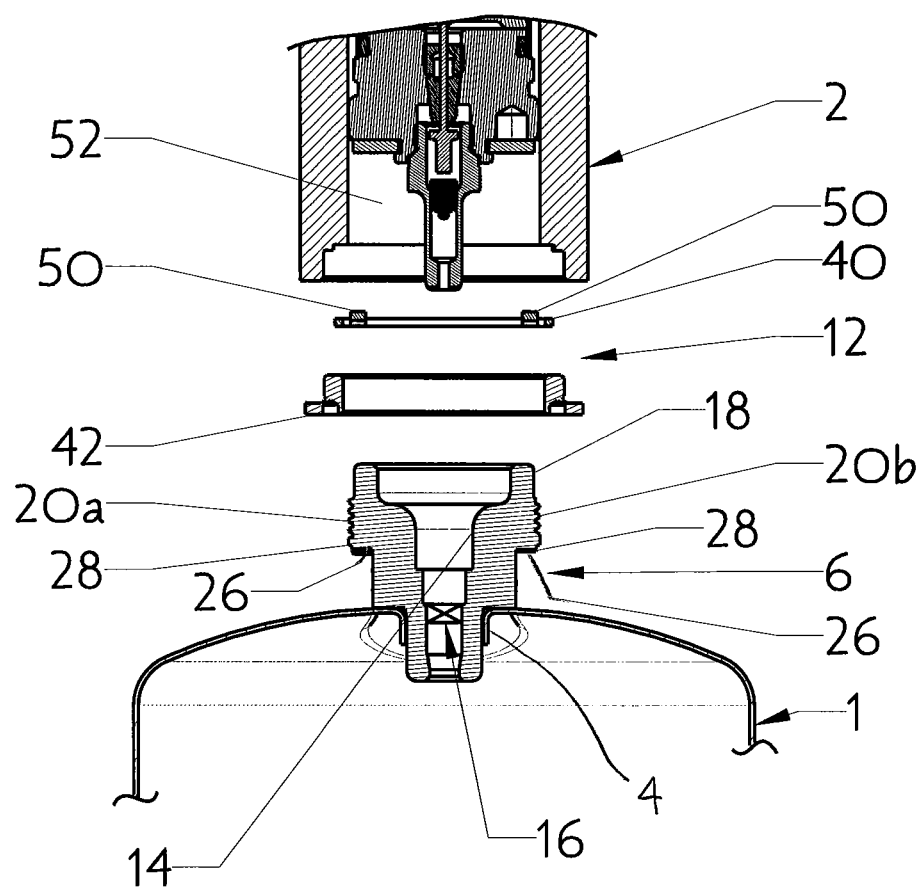
FIG. 3 is a partial section exploded side view showing the coupling of the torch head and canister.
Figure 4:
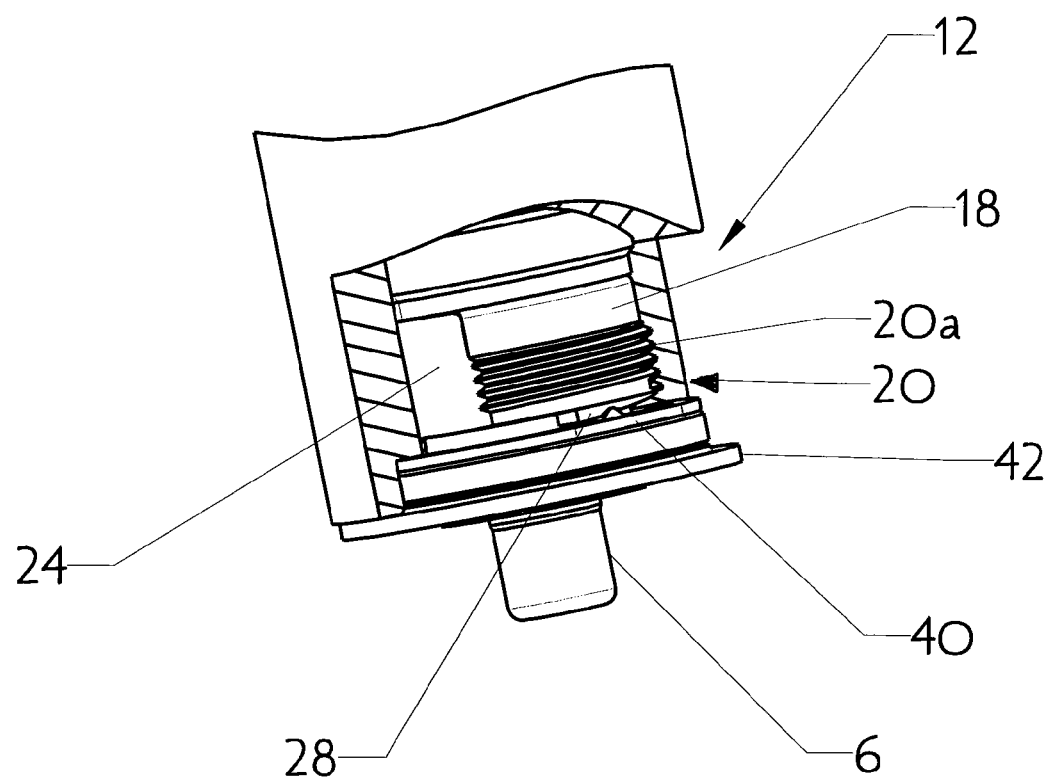
FIG. 4 is a perspective view showing the coupling between the canister and the torch head.
Figure 5:
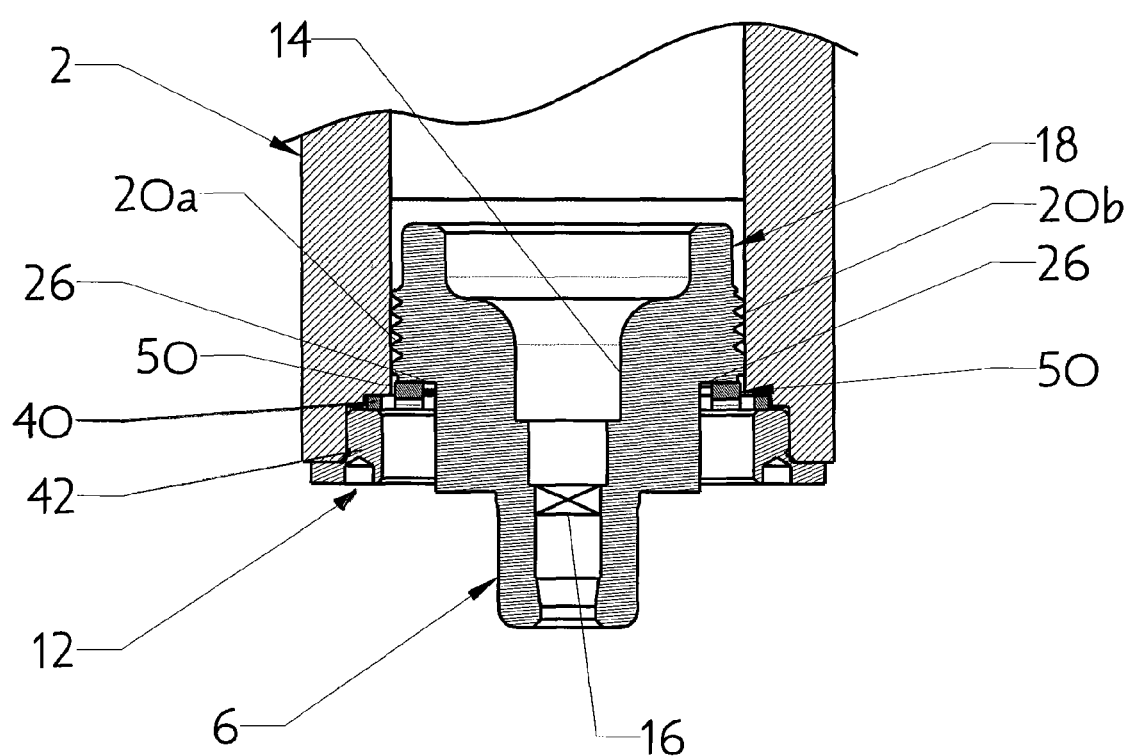
FIG. 5 is a section view showing the coupling between the canister and the torch head.
Figure 6:
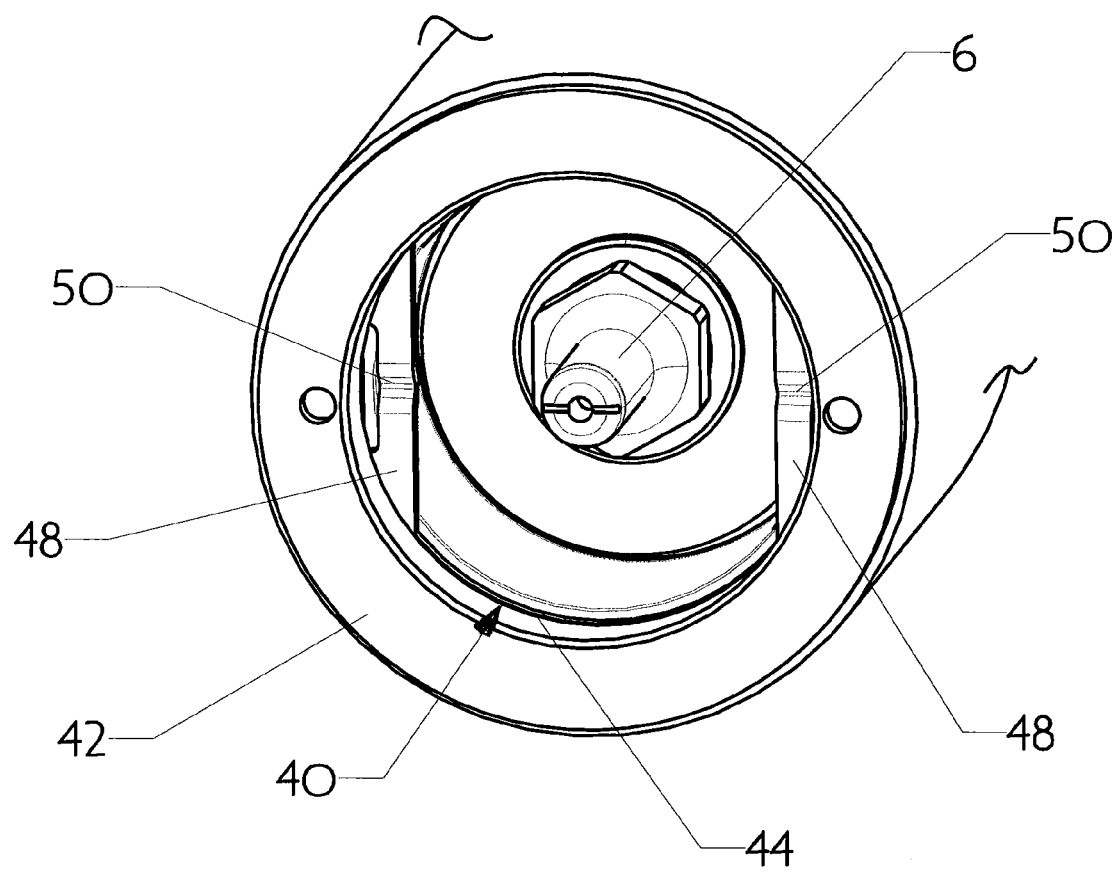
FIG. 6 is a perspective view showing the connector on the torch head.
Figure 7:
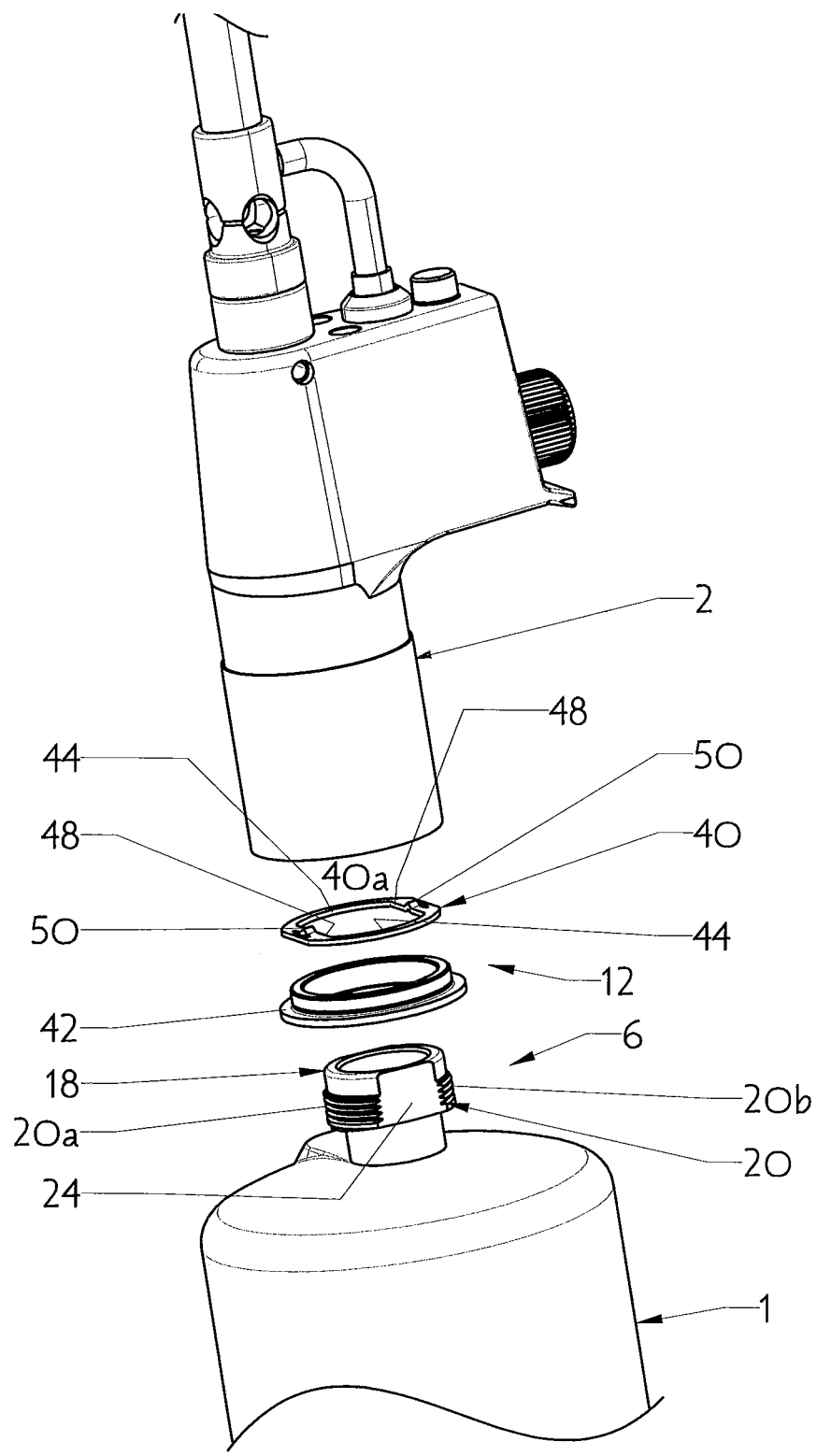
FIG. 7 is an exploded perspective view showing the coupling between the canister and the torch head.
Figure 8:
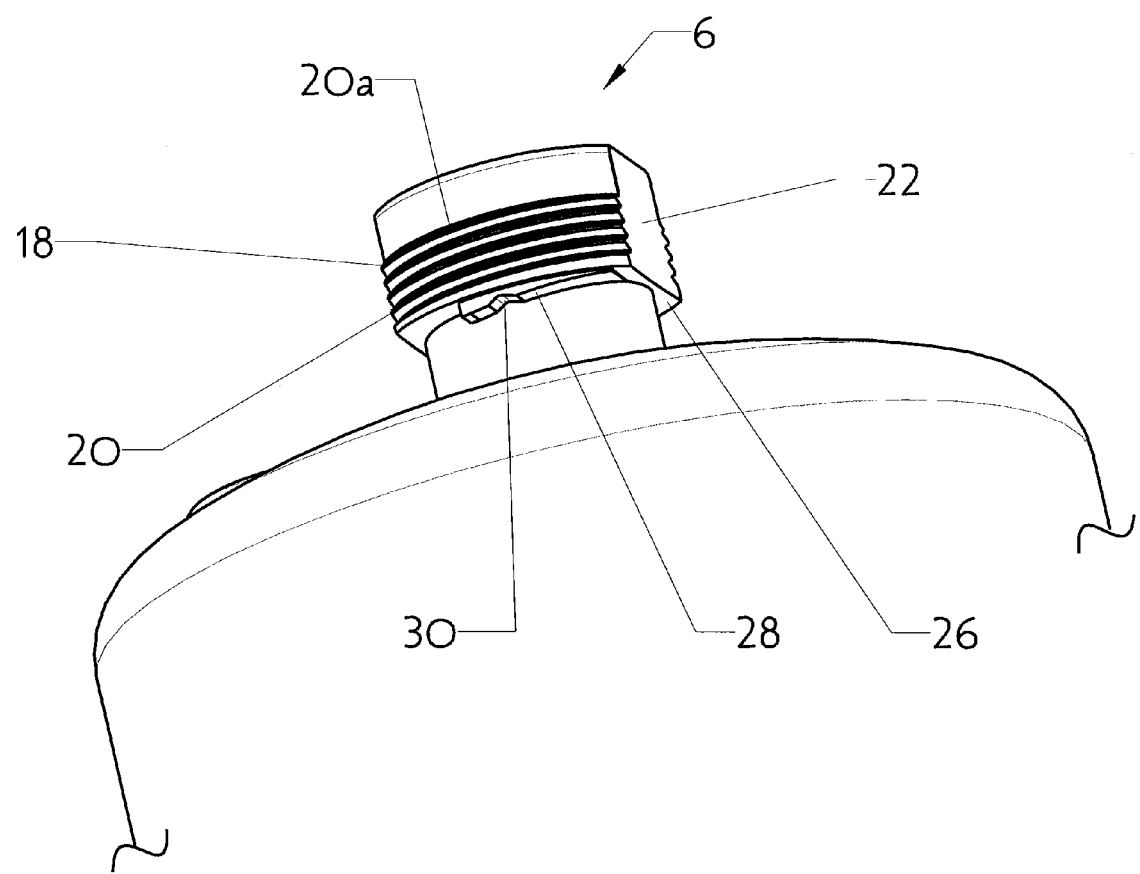
FIG. 8 is a perspective view showing the connector on the canister.

Referring more particularly to FIGS. 3, 4 and 7 the second connector 12 comprises a locking member that, in the illustrated embodiment, is in the form of an annular locking ring 40 that is attached to the end of the torch head 2. Referring to FIG. 5 the locking ring 40 may be attached to the torch head or other appliance by a second annular ring 42 where the second annular ring 42 is fixed to the end of the torch head with the locking ring 40 trapped between the torch head and the second annular ring 42. In one embodiment the second annular ring 42 is formed of a rigid material such as thermoplastic and has an interior diameter slightly greater than the diameter of first connector 6. The second annular ring 42 may be omitted and the locking member 40 connected directly to the torch head 2 such as by welding or a compression fit.

The locking ring 40 is formed of a relatively flexible material such as stamped steel. The locking ring 40 has an interior aperture 40a that is dimensioned and shaped such that it matches the external shape of the first connector 6. In the illustrated embodiment the interior shape of aperture 40a includes rounded portions 44 that correspond to the threaded areas 20a and 20b of connector 6 and straight portions 48 that correspond to flat faces 22 and 24 as best shown in FIG. 7. The locking ring 40 is dimensioned such that the first connector 6 can be inserted through the locking ring 40 with minimum clearance. The shape and dimensions of aperture 40a are selected to match the external dimensions and shape of connector 6 such that the first connector 6 can be inserted through the locking ring 40 with minimum clearance. If the connector 6 has a shape different than the shape illustrated in the drawings, as previously described, the aperture 40a will have a corresponding mating shape and dimensions. For example, if connector 6 has more than two flat faces 22 and 24, aperture 40a will have the corresponding number of straight edges. The mating shapes of the locking member 40 and connector 6 ensure that the connector is in the proper orientation prior to insertion in the torch and that only mating canisters and torches are used with one another.

Protrusions 50 are formed on locking ring 40 such that they extend toward torch 2 and away from the canister 1 when the canister is attached to the torch head 2. The protrusions 50 are biased to the extended position. In one embodiment the protrusions 50 are formed integrally with the locking ring 40 as bent portions of the ring 40 although the protrusions 50 may be formed as separate elements. The protrusions 50 are arranged such that they are spaced about locking ring 40 to align with the recesses 30 formed on the cam surfaces 28 when the torch head 2 is attached to the canister 1. In the illustrated embodiment the protrusions 50 are located at an approximate midpoint along straight portions 48.

The canister may be connected to either a standard appliance such as a torch with standard screw threads or to an appliance with the quick connect coupling described herein (block 1100). As previously described, the canister fitted with the quick connect coupling may be connected to appliances having only the standard threaded connection. Such connections are made by simply threading the screw threads 20 to the existing standard screw threads of a standard appliance (block 1101).

Figure 9:
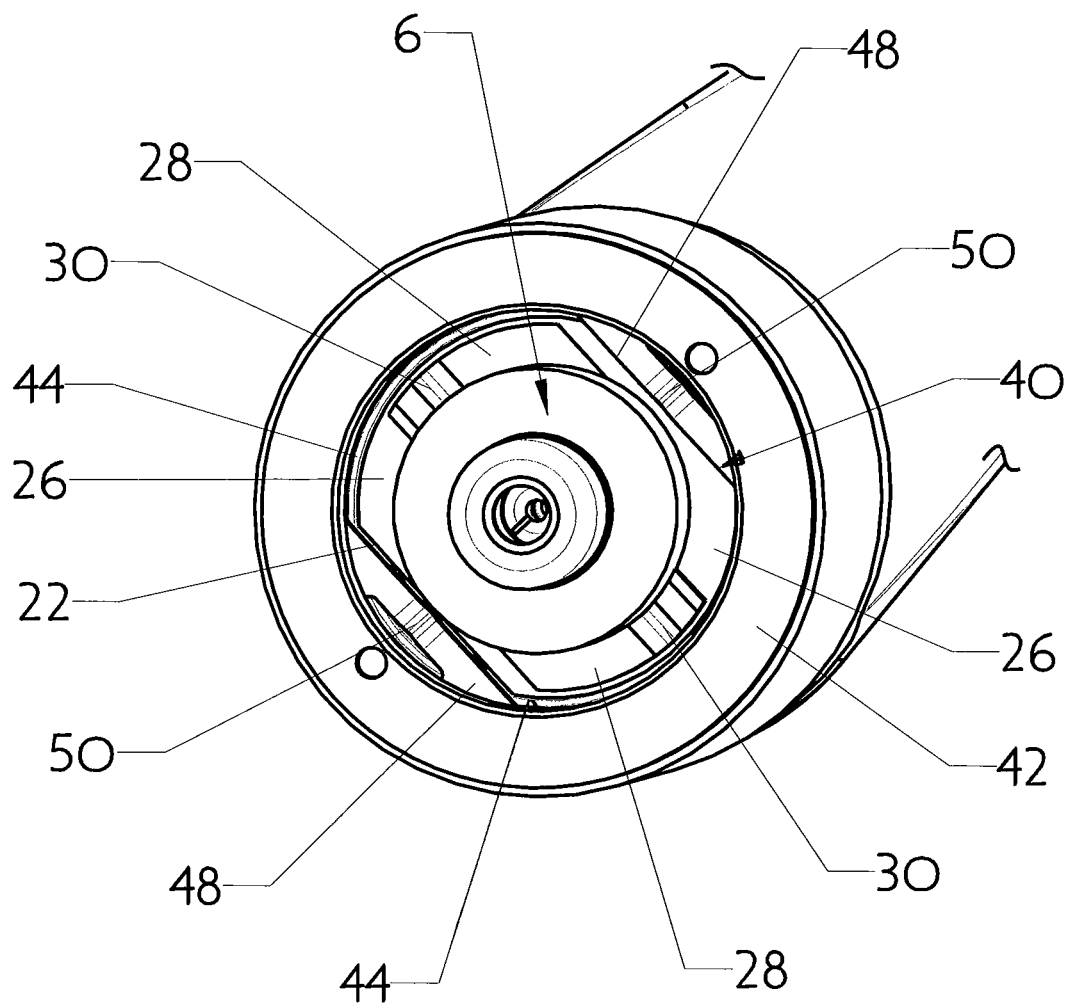
FIG. 9 is a perspective view showing the connector on the canister inserted into the connector on the torch head in the unlocked position.
Figure 10:
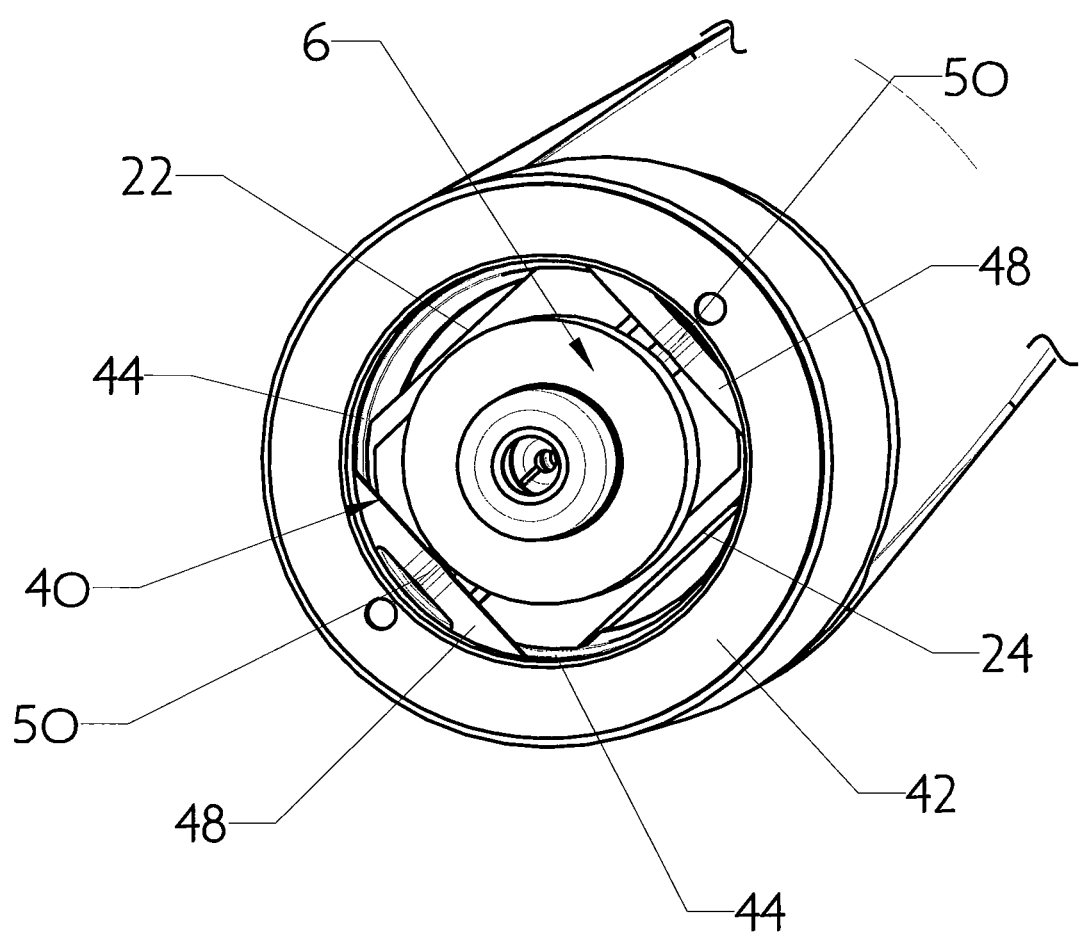
FIG. 10 is a perspective view showing the connector on the canister inserted into the connector on the torch head in the locked position.
Figure 11:
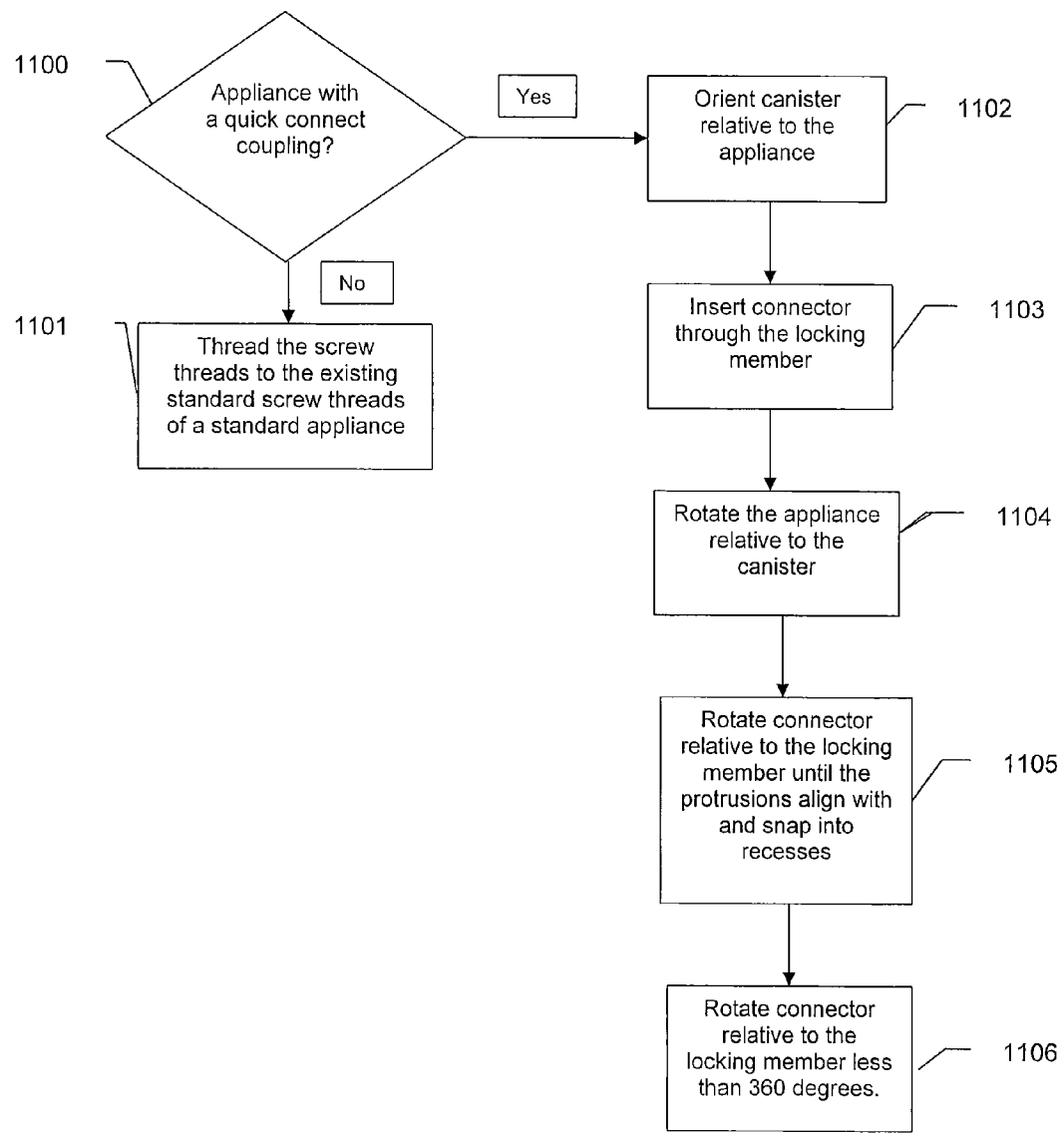
FIG. 11 is a block diagram illustrating a method of using the coupling of the invention.

Operation of the quick connect coupling of the invention will now be described with respect to the torch 2 it being understood that the operation will be substantially the same for any appliance. The canister 1 is oriented relative to the appliance or torch head 2 such that the flat faces 48 on the locking ring 40 are aligned with the flat faces 22 and 24 connector 6, FIG. 9 (block 1102). Connector 6 is inserted through the locking ring 40 until the surfaces of flanges 26 are positioned to the interior of the locking ring 40 (block 1103). The torch head 2 is rotated relative to the canister 1 such that the connector 6 rotates relative to the locking ring 40 (block 1104). As the connector 6 rotates relative to the locking ring 40, the protrusions 50 slide along the cam surfaces 28 to force the protrusions 50 against the bias force that maintains the protrusions 50 in an extended position. The connector 6 is rotated relative to the locking ring 40 until the protrusions 50 align with and snap into the recesses 30, FIG. 10 (block 1105). In one embodiment the protrusions and recesses are arranged such that the connector 6 is rotated relative to the locking member 40 less than 360 degrees and the canister is fully inserted and locked to the torch (block 1106). When the protrusions 50 snap into the recesses 30, the torch head 2 is locked onto the canister 1 such that the fluid line 5 in the torch head is in fluid communication with the canister 1. The fluid line 5 of torch head 2 is inserted into bore 14 to open valve 16 and allow fuel to flow from the canister 1 into the torch head 2.

The torch head 2 can be removed from the canister 1 by reversing the steps described above where the torch head is rotated relative to the canister in the opposite direction. As the torch head 2 rotates relative to the canister 1 the protrusions 50 are depressed and forced out of recesses 30. The torch head 2 is rotated relative to the canister 1 until the flat faces 22 and 24 on connector 6 are aligned with the flat faces 48 of the locking ring 40, FIG. 9. Connector 6 is removed through the locking ring 40 to free the torch head 2 from the canister 1.

In an alternate embodiment the cam surfaces 28 may be made symmetrical such that the canister and torch head may be rotated relative to one another in either direction to connect and disconnect the coupling. For example the cam surfaces may increase in depth from both ends, rather from one end as shown in the drawings.

While embodiments of the invention are disclosed herein, various changes and modifications can be made without departing from the spirit and scope of the invention as set forth in the claims. One of ordinary skill in the art will recognize that the invention has other applications in other environments. Many embodiments are possible.

The invention claimed is:

1. A coupling comprising:
  a female coupling part having a central bore opening to an axial end face thereof, and a locking ring having a non-circular aperture axially aligned with said central bore, the non-circular aperture comprised of a straight portion and a rounded portion, the straight portion defining a radially inwardly extending shoulder;
  a male coupling part having external screw threads located on an outer surface thereof for engagement with corresponding female screw threads of a an associated threaded component when not coupled with the female coupling part, the male coupling part having a non-circular cross-sectional shape along at least a portion of its axial length including said external screw threads, said non-circular cross-sectional shape of the male coupling part including a flat portion and a rounded portion corresponding to a shape of said non-circular aperture, the male coupling part further including a radially extending flange;

wherein when the straight portion of the non-circular aperture of the locking ring and the flat portion of the male part are aligned, the male coupling part is slideably insertable into the bore of the female coupling part to a position where the radially extending flange of the male part is located axially inward of the locking ring of the female part, and wherein subsequent rotation of the male part relative to the female part engages the radially extending flange of the male part with the shoulder of the female part thereby interlocking the male part and the female part to restrict withdrawal of the male part from the female part.

2. A coupling as set forth in claim 1, wherein the radially extending flange includes a cam surface.

3. A coupling as set forth in claim 2, wherein relative rotation of the male and female coupling parts when the male part is received in the female part causes the locking member to engage the cam surface of the flange thereby securing the male and female coupling parts together.

4. A coupling as set forth in claim 1, wherein the locking ring supported within the central bore of the female coupling part.

5. A coupling as set forth in claim 1, wherein the non-circular aperture of the female coupling part further comprises first and second oppositely positioned straight portions, and wherein the non-circular cross-sectional shape of the male part further comprises first and second oppositely positioned flat portions.

6. A coupling as set forth in claim 5, wherein the flat portions of the male part are diametrically opposed flat faces.

7. A fuel canister for an appliance comprising:
a fuel canister having an interior for containing a fuel and a port for communicating the interior of the canister to an associated appliance;
a valve assembly for controlling the flow of fuel from the canister;
a connector comprising a bore through which the fuel flows, said connector comprising external screw threads for engaging a first appliance having a threaded connector, said screw threads being interrupted by at least one non-threaded face said connector having a non-circular periphery at a cross-section taken along a plane perpendicular to an axial length thereof; and a surface formed adjacent said screw threads, said surface comprising an inclined cam surface having a recess formed therein for engaging a non-threaded connector on a second associated appliance.

8. The canister of claim 7 wherein said screw threads are interrupted by at least one flat face.

9. The canister of claim 7 wherein said screw threads are interrupted by a first face and a second face spaced from said first face such that the screw threads comprise a first thread portion and a second thread portion.

10. The canister of claim 9 wherein the first face and the second face comprise parallel surfaces.

11. The canister of claim 7 wherein said screw threads are interrupted by a first face and a second face.

12. The canister of claim 7 wherein said cam surface is for engaging a locking member on said second appliance.

13. The canister of claim 7 wherein said cam surface is offset from said at least one face.

14. The canister of claim 7 wherein said cam surface faces away from said appliances when the connector is connected thereto.

15. The canister of claim 7 further including a flange formed on said connector, said cam surface being on said flange and facing toward said canister.

* * * * *